(12) United States Patent
Heine (10) Patent No.: US 10,182,015 B2
(45) Date of Patent: Jan. 15, 2019

(54) REDUNDANT TRANSMISSION OF DATA FRAMES IN COMMUNICATION NETWORKS HAVING A RING TOPOLOGY

(71) Applicant: SIEMENS AKTIENGESELLSCHAFT, Munich (DE)

(72) Inventor: Holger Heine, Aurich (DE)

(73) Assignee: Siemens Aktiengesellschaft, Munich (DE)

( * ) Notice: Subject to any disclaimer, the term of this patent is extended or adjusted under 35 U.S.C. 154(b) by 79 days.

(21) Appl. No.: 15/329,874

(22) PCT Filed: Jul. 29, 2014

(86) PCT No.: PCT/EP2014/066246
§ 371 (c)(1),
(2) Date: Jan. 27, 2017

(87) PCT Pub. No.: WO2016/015753
PCT Pub. Date: Feb. 4, 2016

(65) Prior Publication Data
US 2017/0264560 A1    Sep. 14, 2017

(51) Int. Cl.
*H04L 12/823* (2013.01)
*G05B 19/418* (2006.01)
(Continued)

(52) U.S. Cl.
CPC .......... *H04L 47/32* (2013.01); *G05B 19/4185* (2013.01); *H04L 12/4015* (2013.01);
(Continued)

(58) Field of Classification Search
None
See application file for complete search history.

(56) References Cited

U.S. PATENT DOCUMENTS 6,202,082 B1 *  3/2001  Tomizawa ............. H04J 3/085
                                                    370/389
6,314,110 B1 * 11/2001  Chin ..................... H04L 47/10
                                                    370/358
(Continued)

FOREIGN PATENT DOCUMENTS

EP        0755137 A1    1/1997
EP        1696604 A1    8/2006
(Continued)

OTHER PUBLICATIONS

Englert, Heiko, Industrial communication networks—High availability automation networks—Part 3: Parallel Redundancy Protocol (PRP) and High-availability Seamless Redundancy (HSR), IEC 62439-3, 2012.

*Primary Examiner* — Brian S Roberts
(74) *Attorney, Agent, or Firm* — Laurence Greenberg; Werner Stemer; Ralph Locher (57) ABSTRACT

A method for redundant transmission of data telegrams between automation devices of an installation by a communication network requires a ring topology. A sending device sends out two data telegrams in different transmission directions of the communication network and a receiving device processes the data telegram arriving at the receiving device first and discards the other data telegram as a duplicate. To ensure fast transmission of data telegrams having important content, the sending automation device assigns a priority level and data telegrams having a high priority level are sent according to a first communication protocol and data telegrams having a low priority level are sent according to a different second communication protocol. A network component arranged between the sending device and the receiving device receives the data telegram, recognizes the priority level based on the communication protocol used, and for- (Continued)

wards the data telegram taking into consideration the priority level.

14 Claims, 2 Drawing Sheets

(51) Int. Cl.
  *H04L 12/40* (2006.01)
  *H04L 12/42* (2006.01)
  *H04L 12/427* (2006.01)
  *H04L 12/801* (2013.01)
  *H04L 12/851* (2013.01)
  *H04L 29/08* (2006.01)
  *H04L 29/06* (2006.01)

(52) U.S. Cl.
  CPC ........ *H04L 12/40182* (2013.01); *H04L 12/42* (2013.01); *H04L 12/427* (2013.01); *H04L 47/13* (2013.01); *H04L 47/24* (2013.01); *H04L 67/12* (2013.01); *H04L 69/18* (2013.01)

(56) References Cited

U.S. PATENT DOCUMENTS

| | | | |
|---|---|---|---|
| 6,529,780 B1 | 3/2003 | Soergel et al. | |
| 2002/0087716 A1* | 7/2002 | Mustafa | H04L 29/06 709/236 |
| 2006/0109802 A1* | 5/2006 | Zelig | H04L 12/42 370/258 |
| 2008/0068988 A1* | 3/2008 | Tochio | H04L 45/22 370/228 |
| 2009/0024811 A1 | 1/2009 | Drebinger | |
| 2009/0109841 A1* | 4/2009 | Nozaki | H04L 45/00 370/218 |

FOREIGN PATENT DOCUMENTS

| | | |
|---|---|---|
| EP | 2148473 A1 | 1/2010 |
| RU | 2213365 C2 | 9/2003 |
| RU | 2421769 C2 | 6/2011 |
| WO | 2010010120 A1 | 1/2010 |

\* cited by examiner

FIG 1

REDUNDANT TRANSMISSION OF DATA FRAMES IN COMMUNICATION NETWORKS HAVING A RING TOPOLOGY

BACKGROUND OF THE INVENTION

Field of the Invention

The invention relates to a method for transmitting data frames between automation devices of an automation system, which automation system comprises a communication network having a ring topology, and the automation devices transmit the data frames redundantly via the communication network. In this method, a sender automation device sends a first data frame in a first transmission direction of the communication network, and a second data frame in a second transmission direction of the communication network, which is opposite to the first transmission direction, and a receiver automation device processes the data frame that it receives first and discards the other data frame as a duplicate. The invention also relates to an automation system and to a sender automation device, a receiver automation device and a network component for such an automation system.

Automation systems are used in many different technical sectors nowadays. They usually comprise a multiplicity of automation devices, which are designed to control by open-loop and/or closed-loop means, to protect and/or monitor and supervise a technical system or a technical process. The automation devices are typically connected to a communication network for the purpose of information transfer. The information can be transmitted via said network in the form of data frames, for example. Further network components, which control and manage the correct transmission of the data frames, are usually provided in the communication network between the individual automation devices. The following text considers to be network components both network-compatible terminals (e.g. individual automation devices which themselves act as "intermediaries" for data frames in the communication network) and those devices used primarily for controlling and managing the transmission of data frames in the communication network (for example switches, bridges, hubs, routers).

Many automated systems and processes (e.g. electrical power grids) require high reliability against failure. This requirement has significant implications for the associated automation system and hence for the communication network that is used to interconnect the automation devices and network components of such a system. Thus such communication networks typically have a redundant design, which means that the reliable transmission of data frames between sender and receiver is guaranteed even when a communication link within the communication network fails. The term "communication link" is used below in the sense of the entire transmission path, i.e. is intended to include both an existing (wired or wireless) transmission medium and the connection in the form of hardware, software and communication technology (e.g. interfaces, communication devices, protocol stacks) of said medium to the relevant automation device and/or to the relevant network component.

Examples of the use of such a communication network intended to have a failsafe design are automation systems for operating electrical power grids or electrical substations, wherein network-compatible automation devices are interconnected via the communication network for the purpose of transferring data frames. Such automation systems typically comprise automation devices (e.g. what are known as field devices), which are arranged close to primary components of the relevant system, so for instance of the electrical power grid. In the case of an electrical power grid, examples of such primary components are electrical cables and leads, transformers, generators, motors or inverters. The automation devices may be what are known as electrical protective devices or bay controllers, which are installed in substations of electrical power grids. The technical term that is often also used for such automation devices is "IEDs" ("Intelligent Electronic Devices"). In this context, the automation devices are connected to the communication network, via which they transfer data frames, which comprise as payload data, for example, control commands, messages about events (e.g. threshold value violations), measurement values or status messages.

EP 2148473 A1, for example, discloses a method of the type mentioned in the introduction, which is defined under the name "High availability, Seamless Redundancy" as international standard IEC 62439-3:2012 HSR. An HSR communication network has a ring topology structure, with each network component incorporated in the ring by two communication connections. A sender device sends a data frame in both directions of the ring, the receiver device receives the first data frame to arrive and discards the second as a duplicate. By virtue of the closed ring structure, there are always two mutually independent communication paths between all connected devices, so that even when there is a fault in one of the two communication paths, the transmission of the data frame via the other transmission path is guaranteed.

In addition, when data frames are transmitted in communication networks of automation systems, delays in the data transmission may arise because of the limited transmission bandwidth of the communication network. Such delays have a critical impact in particular when they affect data frames containing very important data and/or data for quick transmission, whereas they have less impact on other data frames that contain data which is less important and/or can be transmitted over a longer time period. In the case of an automation system of a power grid, the data frames can have as content what are known as fault records, for example, i.e. changes in measurement values recorded during a fault for subsequent analysis, which are meant to be transmitted from an electrical field device to a grid control center. This transmission cannot be considered time-critical. Other examples of data frames that are not time-critical are status information, monitoring data and firmware downloads. It is also necessary, however, to transmit via the same communication network between the automation devices of the power automation system messages identifying an active fault and/or measurement values to be analyzed quickly and/or control commands, which must arrive quickly at the relevant receiver because the automation system must respond thereto in the shortest possible time, and therefore a delay in the transmission of data frames having corresponding content cannot be tolerated. Other examples of time-critical data frames are GOOSE frames (Generic Object Oriented Substation Event) or Sampled Measured Values (SMV), as specified by IEC standard 61850 for communication in switchyards and substations, and time synchronization messages (e.g. as specified in IEEE standard 1588).

Proceeding from a method of the type mentioned in the introduction, the object of the invention is to develop redundant transmission of data frames in a communication network having a ring topology in such a way that relatively fast transmission can be guaranteed for data frames having important and/or time-critical content.

BRIEF SUMMARY OF THE INVENTION

This object is achieved by a method of the type mentioned in the introduction, in which the sender automation device assigns a priority level to the data frames, wherein data frames having a high priority level are meant to be transmitted via the communication network with preference over those data frames having a low priority level, the sender automation device uses a first communication protocol to transmit data frames having a high priority level, and uses a second communication protocol, which differs from the first communication protocol, to transmit data frames having a low priority level, and a network component arranged in the communication network between the sender automation device and the receiver automation device receives the particular data frame, identifies the priority level of said data frame from the communication protocol used, and forwards said data frame taking into consideration the identified priority level.

By the assignment of priority levels to the individual data frames by the sender, and appropriate handling of the data frames by a network component arranged between the sender and the receiver, it can be ensured that those data frames having important and/or time-critical content are forwarded preferentially in the communication network, and thus arrive more quickly at the receiver than a data frame having content that is less important and/or less time-critical. In addition, a very simple method for identifying the particular priority of the data frame is provided by using the choice of the communication protocol to express the priority levels. This means that in order to identify the priority level it is necessary merely to identify which communication protocol has been used to form the data frame, rather than to perform time-consuming evaluation of the content of the data frames. This allows rapid identification of the priority level of the data frames, ensuring that forwarding is correspondingly fast.

The terms "sender automation device" and "receiver automation device" here merely denote the current role of the particular automation device of the automation system in the transmission of data frames. In general, each automation device can be a sender automation device when sending data frames, and a receiver automation device when receiving data frames. The roles can obviously swap during operation of the automation system according to the particular communication requirement (sending, receiving). An automation device which merely is arranged between sender and receiver and performs forwarding of data frames can also be considered to be a network component in this role.

An advantageous embodiment of the method according to the invention provides that those data frames that are transmitted using the first communication protocol differ in terms of their frame structure from those data frames that are transmitted using the second communication protocol.

The particular priority level can hence be identified particularly easily, because the particular communication protocol used for transmitting the data frames becomes apparent just by simple consideration of the frame structure without the need to perform any evaluation whatsoever of the content.

In this context, an advantageous embodiment also provides that the data frames of the first communication protocol and of the second communication protocol differ at least in terms of the position in the frame structure of an identifier for the communication protocol type, in particular of a redundancy block.

The communication protocol can easily be identified from the identifier without any check of the content of the data frame. Provided the data frames of the communication protocols used differ in the position of the identifier in the frame structure, it is hence possible to use the position of said identifier to deduce the communication protocol and thus the priority level.

It can also be provided in this context that an identifier for data frames of the first communication protocol is arranged in an earlier position in the frame structure than an identifier for data frames of the second communication protocol.

It is hence possible to identify the communication protocol and the priority level back at an early point in time while the data frame is being received.

A redundancy block is preferably used as the identifier, because data frames that are transmitted redundantly in communication networks in fact usually already contain redundancy blocks ("redundancy tags"), which are used in particular for duplicate identification. Furthermore, for a data frame having an identifier that is in the form of a redundancy block and located in an early position, the duplicate can be identified early, thus ensuring that data frames are forwarded quickly.

With regard to one of the embodiments having a redundancy block as the identifier, according to a further advantageous embodiment, the receiver automation device comprises a duplicates filter, which identifies the redundancy block of the data frames for each of the two communication protocols, reads the content of said redundancy block and uses the currently read redundancy block to identify and discard duplicates of data frames that have already been received.

The duplicates filter of the receiver automation device in this case is advantageously able to identify and evaluate the redundancy block both for data frames of the first communication protocol and for data frames of the second communication protocol. The duplicates filter having this capability can be embodied here both as hardware and software or as a combination thereof. Thus a receiver automation device can be made into a device capable of performing the method according to the invention solely by adapting the duplicates filter.

According to another advantageous embodiment of the method according to the invention, the network component arranged in the communication network between the sender automation device and the receiver automation device uses the redundancy block to identify the particular communication protocol of a received data frame, reads the redundancy block immediately after it is received, and evaluates said redundancy block in terms of identifying data frames circulating in the communication network, and immediately after completing the evaluation, forwards a data frame received for the first time and discards a data frame received more than once.

This advantageously avoids the communication network being overloaded by circulating frames, because such data frames are removed from the communication network. A circulating data frame is deemed to be a data frame that has made at least one complete circuit of the ring communication network without having arrived at the intended receiver. A duplicate can be identified, for example, from a sequence number contained in the redundancy block and from a sender MAC address also inserted in the data frame (MAC="Media Access Control"). It also has the advantage that since a redundancy block of a data frame is evaluated immediately after being received without having to wait to receive the entire data frame, a data frame can be forwarded or removed already at a very early point in time. In this context, the advantage of an early position of the redundancy block in the structure of the data frame becomes apparent particularly for data frames having a high priority level, because this data frame is forwarded with a correspondingly short delay.

Specifically regarding the choice of the communication protocols, it can be provided, for example, that the data frames having a high priority level are transmitted using the HSR communication protocol, and the data frames having a low priority level are transmitted using the PRP communication protocol.

IEC standard 62439-3:2012 specifies both the HSR protocol already mentioned in the introduction and the PRP protocol ("Parallel Redundancy Protocol"). The HSR protocol is intended to be a communication protocol for the redundant transmission of data frames in ring communication networks, and therefore is suitable preferably for indicating the data frames having a high priority level. The redundancy block of an HSR frame lies in front of the payload data block, and therefore the redundancy block can be evaluated early by a duplicates filter and, if applicable, the data frame can be forwarded quickly, even before it has been received in full. The PRP protocol, on the other hand, is in principle designed for parallel networks. With PRP, seamless redundancy is achieved by the communication network comprising two mutually independent sub-networks of any topology, and each device and each network component being connected to both sub-networks. Both sub-networks work in parallel mode, in which a network component, for the purpose of transmitting a data frame, sends this data frame both to the first sub-network and to the second sub-network. The network component intended as the receiver of the data frame receives both data frames from the sub-networks, using the data frame that it receives first and discarding as a duplicate the data frame that arrives later. Since the two data frames use two mutually independent transmission paths in this case, it is guaranteed even when there is a fault in one of the transmission paths that the payload data conveyed by the data frame reaches the receiver network component via the other transmission path, which is normally still intact. The aforementioned EP 2148473 A1 also describes the transmission of data frames using the PRP communication protocol in pure PRP communication networks.

Although it may be unusual to transmit in ring-topology HSR networks PRP frames, which are actually alien to the network, it is not prohibited in principle by the standard. Indeed since both communication protocols are based on Ethernet technologies and moreover have a similar frame structure, PRP frames can be sent in HSR networks without a problem. Since in PRP data frames the redundancy block is not positioned until after the payload data block, it is suitable to use the PRP protocol for data frames of low priority because it is possible to leave evaluation of the redundancy block until a later point in time compared with an HSR data frame.

According to another advantageous embodiment of the method according to the invention, it is also provided that the network component arranged in the communication network between the sender automation device and the receiver automation device terminates an active forwarding of a data frame having a low priority level as soon as it receives a data frame having a high priority level, forwards first the data frame having a high priority level, and having completed transmission of the data frame having a high priority level, forwards again the data frame having a low priority level.

This can achieve faster and preferential forwarding of data frames having a high priority level, because the transmission of a data frame having a low priority level is terminated immediately in favor of forwarding a data frame having a high priority level.

Alternatively, according to another advantageous embodiment of the method according to the invention, it can also be provided that the network component arranged in the communication network between the sender automation device and the receiver automation device interrupts an active forwarding of a data frame having a low priority level as soon as it receives a data frame having a high priority level, forwards first the data frame having a high priority level, and having completed transmission of the data frame having a high priority level, forwards the portion that has not yet been forwarded of the data frame having a low priority level.

In the latter case, the transmission of the data frame having a low priority level is not terminated completely but merely interrupted in favor of forwarding the higher-priority data frame. The portion that has not yet been forwarded of the low-priority data frame is forwarded following the forwarding of the higher-priority data frame. It can hence be achieved in particular for long low-priority data frames that there is no need to forward said data frames from the beginning every time, because only the portions that have not yet been forwarded need to be transmitted. Thus overall this can advantageously achieve a more uniform network load on the communication network.

In this context, according to an advantageous embodiment, a further network component arranged in the communication network between the sender automation device and the receiver automation device waits to receive in full a data frame having a low priority level before it forwards this data frame.

The result of this is that only a few frame fragments are transmitted in the communication network despite the interruption taking place in the forwarding of low-priority data frames. Specifically, the currently downstream network component always waits to receive an interrupted data frame in full, and assembles this data frame first before forwarding it to the next network component or to the receiver automation device.

The aforementioned object is also achieved by an automation system having a plurality of automation devices, which are designed for the redundant transfer of data frames via a communication network, wherein the communication network comprises at least a sender automation device and a receiver automation device and also a network component arranged in the communication network between the sender automation device and the receiver automation device, and has a ring topology. In said system, the sender automation device is designed to send a first data frame in a first transmission direction of the communication network, and a second data frame in a second transmission direction of the communication network, which is opposite to the first transmission direction, and the receiver automation device is designed to process the data frame that it receives first and to discard the other data frame as a duplicate.

According to the invention, the sender automation device is designed to assign a priority level to the data frames, wherein data frames having a high priority level are meant to be transmitted via the communication network with preference over those data frames having a low priority level, the sender automation device is also designed to use a first communication protocol to transmit data frames having a high priority level, and to use a second communication protocol, which differs from the first communication protocol, to transmit data frames having a low priority level, and the network component arranged in the communication network between the sender automation device and the receiver automation device is designed to receive the particular data frame, to identify the priority level of said data frame from the communication protocol used, and to forward said data frame taking into consideration the identified priority level.

The aforementioned object is also achieved by a sender automation device for operation in such an automation system, which device is designed, in the redundant transmission of data frames, to send a first data frame in a first transmission direction of the communication network, and a second data frame in a second transmission direction of the communication network, which is opposite to the first transmission direction.

According to the invention, the sender automation device is designed to assign a priority level to the data frames, wherein data frames having a high priority level are meant to be transmitted via the communication network with preference over those data frames having a low priority level, and the sender automation device is also designed to use a first communication protocol to transmit data frames having a high priority level, and to use a second communication protocol, which differs from the first communication protocol, to transmit data frames having a low priority level.

The aforementioned object is also achieved by a network component for operation in such an automation system, which network component is designed to receive a particular data frame, to identify the priority level of said data frame from a communication protocol used, and to forward said data frame taking into consideration the identified priority level.

Finally, the aforementioned object is also achieved by a receiver automation device for operation in such an automation system, which device is designed to process a data frame that it receives first and to discard another data frame of identical content as a duplicate.

According to the invention, the receiver automation device comprises a duplicates filter, which is designed to identify a corresponding redundancy block of the data frames of a first communication protocol and of a second communication protocol, which differs from the first communication protocol, to read the content of said redundancy block and to use the currently read redundancy block to identify and discard duplicates of data frames that have already been received.

All the embodiments presented above and below with regard to the method according to the invention apply with regard to the communication network according to the invention, the sender automation device according to the invention, the network component according to the invention and the receiver automation device according to the invention, and vice versa accordingly; in particular, the communication network according to the invention, the sender automation device according to the invention, the network component according to the invention and the receiver automation device according to the invention are designed to implement the method according to the invention in any embodiment or a combination of any embodiments. In addition, with regard to the advantages, reference is made to the advantages described for the method according to the invention.

BRIEF DESCRIPTION OF THE SEVERAL VIEWS OF THE DRAWING

The invention is described in greater detail below with reference to an exemplary embodiment. The specific design of the exemplary embodiment shall have no limiting effect whatsoever on the general design of the method according to the invention, of the communication network according to the invention, of the sender automation device according to the invention, of the network component according to the invention and of the receiver automation device according to the invention; in fact individual design features of the exemplary embodiment can be freely combined in any way with one another and with the features described above.

DESCRIPTION OF THE INVENTION

Figure 1:
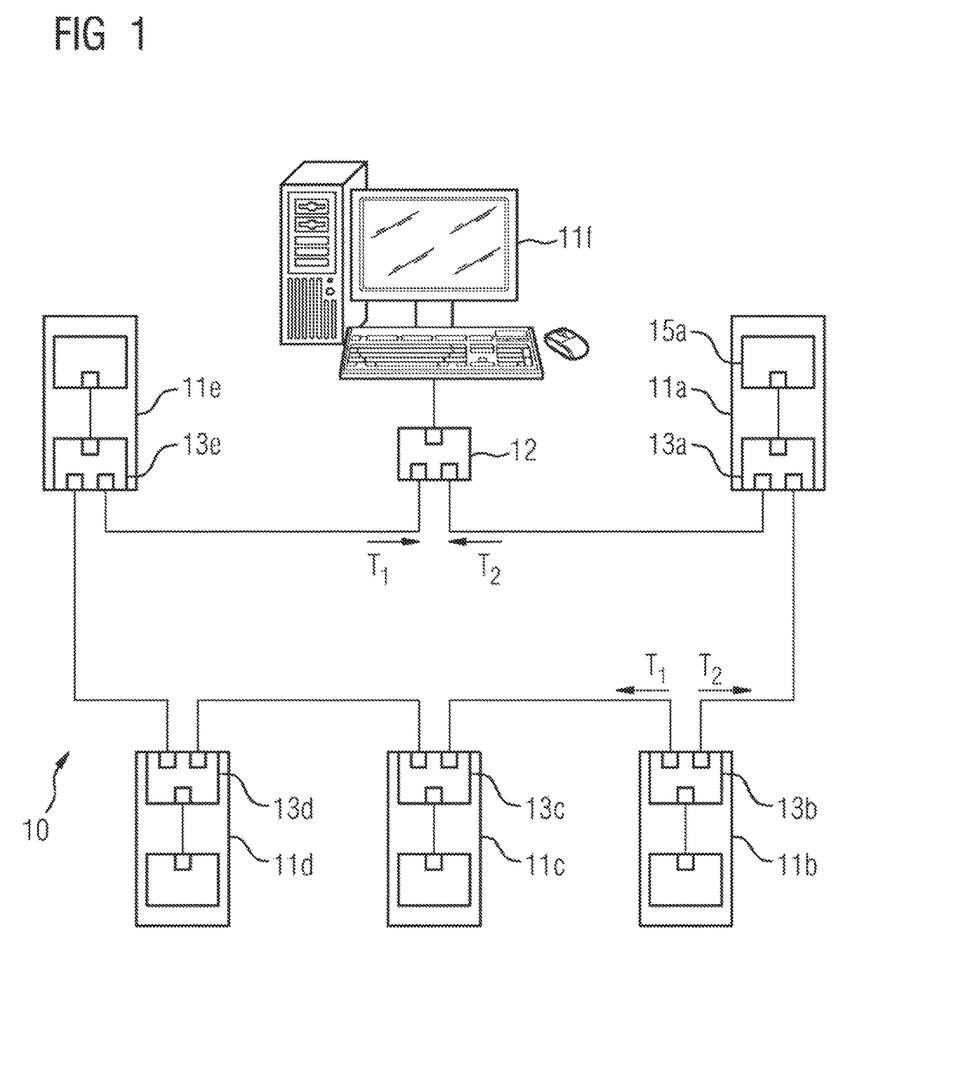
FIG. 1 is a schematic view of an exemplary embodiment of a communication network having a ring topology.

FIG. 1 shows a schematic view of a communication network 10 of an automation system, other details of which are not shown. The automation system, which may be, for example, an automation system for controlling by open-loop and/or closed-loop means, monitoring and/or protecting an electrical power grid or a substation of an electrical power grid, comprises a plurality of automation devices 11a-f. The automation devices 11a-e in this case may be, for example, protection devices, meters, phasor meters, power meters, power quality devices, control stations and control devices, switch controllers etc. of an electrical power automation system. Such automation devices can also be referred to in general as field devices or as IEDs ("intelligent electronic devices"). The automation device 11f is a control station, which may be e.g. a workstation in a grid control center or in a substation. The specific structure shown in FIG. 1 of the communication network 10 shall be understood to be purely by way of example. The invention can obviously include any other arrangements.

The automation devices 11a-e are connected via integrated network components 13a-e, and the automation device 11f via an external network component 12, to the communication network 10 to form a ring network topology. For this purpose, each integrated network component 13a-e and the external network component 12 have two ports for connecting to the communication network 10. In addition, the integrated network components 13a-e each have an internal port for connecting to a control device, e.g. to a CPU, of the particular automation device (for the sake of clarity, only the control device 15a of the automation device 11a is labelled by way of example; the other automation devices have an identical or at least similar design). The external network component 12 is connected to the automation device 11f via a further port. The network components 13a-e and 12 may be switches, for example.

During operation of the automation system, the automation devices 11a-f transmit data frames amongst one another redundantly. This shall be explained in greater detail below using an example.

For this example it shall be assumed that the automation device 11b (also referred to below as the "sender automation device") transmits a piece of information, e.g. an instantaneous measurement value, to the automation device 11f (also referred to below as the "receiver automation device"). In order that the information is transmitted reliably, the sender automation device 11b generates two data frames T1 and T2 using the information to be transmitted, which data frames contain identical payload data. The sender automation device 11b transmits the first data frame T1 in a first transmission direction of the communication network 10, and the second data frame T2 in a second transmission direction of the communication network 10, which is opposite to the first transmission direction. In the example of FIG. 1, the first transmission direction, in which the first data frame T1 is transmitted, runs clockwise, whereas the second transmission direction, in which the second data frame T2 is transmitted, runs counterclockwise.

The first data frame T1 passes around the ring of the communication network 10, and in the process is forwarded by the network components 13c-e of the automation devices 11c-e. The first data frame T1 finally reaches the network component 12, which forwards it to the receiver automation device 11f. The second data frame T2 passes around the ring of the communication network 10 in a corresponding manner in an opposite direction, and in the process is forwarded by the network component 13a of the automation device 11a. The second data frame T2 also finally reaches the network component 12, and is forwarded to the receiver automation device 11f.

The receiver automation device 11f receives the data frames T1 and T2, and processes further the data frame that it receives first, and discards as a duplicate the other data frame that arrives later. Alternatively, the duplicates filtering can also be performed already directly in the network component 12 associated with the receiver automation device 11f. In this regard, the external network component 12 shall be considered, just like the integrated network components 13a-e, to be part of the automation device concerned.

A duplicate can be identified, for example, from the MAC address of the sender (in this case of the sender automation device 11b) and from a sequence number, which is allocated by the sender and is identical for both data frames T1 and T2.

By transmitting the data frames T1 and T2 in the manner described, it can be guaranteed that the content of the data frames T1 and T2 arrives at the receiver even when there is a break in a transmission path, because there are always two independent paths between two automation devices thanks to the ring network topology.

In order to avoid a high load on the communication network 10 as a result of what are known as "circulating frames", each network component 13a-e, 12 that forwards a data frame to a receiver, performs identification of circulating frames. This involves checking, separately for each transmission direction, whether a currently received data frame has already been received once before. This can likewise be identified from the MAC address of the sender and from the sequence number of the data frame. These properties are stored at least temporarily e.g. in a table of the network component concerned, so that it can be easily established by comparing with the properties saved in the table whether the same data frame has been received again. A data frame identified as a circulating frame is subsequently discarded and no longer forwarded, whereas a data frame received for the first time is forwarded in accordance with its transmission direction.

The method described above for redundant transmission of data frames is also specified as the "HSR" part of the international standard IEC 62439-3:2012. Nevertheless, the method described for transmitting data frames can be used generally in ring communication networks and is not restricted specifically to HSR networks.

In automation systems, data frames having content of different importance are usually transmitted via the same communication network. For example, data frames containing event messages or measured values can be considered more important to the smooth operational running of the automation system than data frames containing recorded fault records or firmware updates. Without any appropriately prioritized transmission of the data frames, data frames of relatively low importance might block or at least delay those of high importance. This becomes noticeable in particular for data frames containing a large amount of payload data (e.g. for firmware updates).

It is therefore provided that the sender automation device assigns to the data frames to be transmitted a priority level that defines the importance of the data frame. Data frames having a high priority level are transmitted in the communication network with preference over those having a low priority level.

The sender automation device uses different communication protocols as a distinguishing feature between data frames of high priority and data frames of low priority. The data frames having a high priority level are thus transmitted using a different communication protocol from those having a low priority level. A pair of data frames that belong together, for instance the data frames T1 and T2 given in the example described above, are transmitted in each case with the same priority level, however, because they have the same content and hence are equally important (or unimportant). A network component receiving the particular data frame identifies the priority level from the communication protocol used and forwards the data frame taking into consideration the priority level.

In order to identify the priority level without having to check the contents of the data frame, it can be provided that the communication protocols used for the data frames of different priority level differ even in terms of the frame structure. Hence the particular communication protocol, and thus the particular priority level, can be identified effectively "from the outside", i.e. without a detailed check of the content, solely from the frame structure.

For example, the frame structure of the different communication protocols used can differ in terms of the position of a specific identifier, from which position the communication protocol can be derived. What is known as a redundancy block may be used, for instance, as an identifier, which redundancy block is provided anyway in data frames in communication networks using redundant transmission, which means that there is no need to insert any additional blocks into the frame structure for the identifier. A redundancy block (also known as a "redundancy tag") includes amongst other information, for example, a sequence number of the data frame, which can be used to identify duplicates and circulating frames.

For example, the identifier for the first communication protocol can be arranged before the payload data block, and for the second communication protocol can be arranged after said block. In this case, a network component could identify that the data frame has a structure according to the first communication protocol as soon as it detects an identifier lying before the payload data block, and, in accordance with the high priority level of this data frame, forward said data frame along the transmission direction immediately, if applicable even without waiting for the payload data block to be received in full.

In general, rapid forwarding of the data frame can be facilitated by an identifier for the type of the communication protocol used lying before the payload data block.

On the other hand, for data frames having a low priority level, the communication protocol used can have a structure containing an identifier lying after the payload data block, because for such data frames the transmission speed is not critical anyway.

The HSR communication protocol can be used, for example, as the first communication protocol for data frames having a high priority level, and the PRP communication protocol can be used for data frames having a low priority level. The IEC standard 62439-3:2012 specifies these communication protocols. In simplified form and by way of example, FIG. 2 shows the frame structure of a data frame according to HSR, and FIG. 3 shows the frame structure of a data frame according to PRP, where the size of the individual blocks of the particular frame structure do not correspond exactly to the amount of data contained in each of the blocks.

Figure 2:
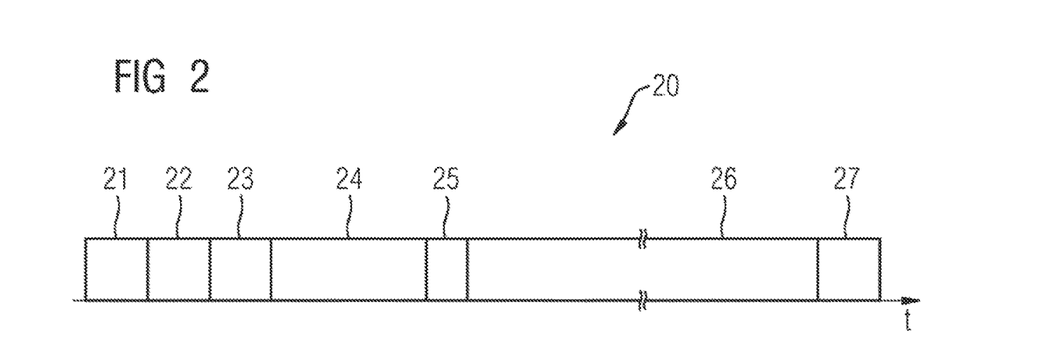
FIG. 2 is a schematic and simplified diagram of the frame structure of a data frame according to a first communication protocol.

FIG. 2 shows the frame structure of an HSR data frame 20 along a time axis. The data frame 20 starts with a preamble block 21, which usually comprises a predefined sequence of zeros and ones. Following the preamble block 21 is a receiver block 22 that specifies the receiver (e.g. using the MAC address of the receiver), after which is a sender block 23 that specifies the sender (e.g. using the MAC address of the sender). The sender block 23 is followed by a redundancy block 24, which includes amongst other information a sequence number of the data frame. After the redundancy block 24 is provided in the frame structure a type block 25 (LT="Length Type"), which defines the type of the data frame (e.g. GOOSE message). Following the type block 25 is a payload data block 26, which comprises the actual payload data content (e.g. a measured value or an event message) of the data frame, and usually makes up the largest portion of the data frame. Finally, after the payload data block 26 comes a checksum block 27, which contains a checksum for the data frame.

Figure 3:
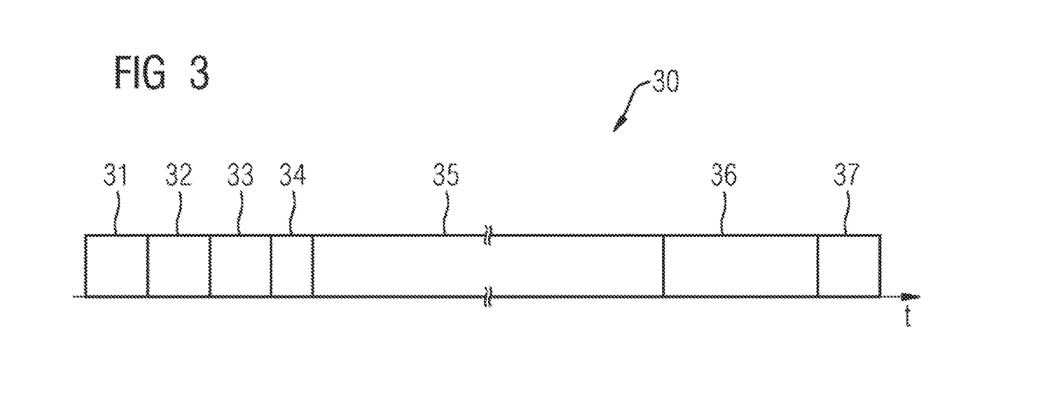
FIG. 3 is a schematic and simplified diagram of the frame structure of a data frame according to a second communication protocol.

FIG. 3 shows the frame structure of a PRP data frame 30 along a time axis. The data frame 30 likewise begins with a preamble block 31, likewise followed by a receiver block 32 and a sender block 33. For the PRP data frame 30, the sender block 33 is followed first by the type block 34 and by the payload data block 35. For the frame structure of the PRP data frame 30, the redundancy block 36 containing the sequence number of the data frame 30 is provided after the payload data block 35. Finally, after the redundancy block 36 likewise comes a checksum block 37.

It is evident in comparing the two data frames 20 and 30 that the redundancy block 24 in the HSR data frame 20 lies in an earlier position than the redundancy block 36 in the PRP data frame. Thus the particular frame structure can be used not only to distinguish easily between the data frames of the two communication protocols but also to identify and forward more quickly the HSR data frames, by which the higher priority level is indicated.

Returning to the above example, the transmission of data frames of different priority levels between the sender automation device 11b and the receiver automation device 11f shall be explained below.

It shall be assumed first that the sender automation device 11b transmits redundant data frames having a low priority level to the receiver automation device 11f in accordance with the procedure described above. The assignment of the priority level to the respective data frames is performed by the sender automation device. The data frames are transmitted using the second communication protocol, for example the PRP protocol, in accordance with the chosen low priority level.

The path of the first of the two redundant data frames (clockwise transmission direction) shall be considered first. After transmission by the sender automation device 11b, the data frame is received by the network component 13c of the automation device 11c. Since the network component 13c identifies from the receiver entered in the data frame that the data frame is not addressed to the automation device 11c, it checks the data frame for its communication protocol and deduces the associated priority level therefrom. Thus the network component 13c identifies from the use of the second communication protocol (e.g. PRP) that it is a data frame having a low priority level. Specifically, the identification can be made, for example, from the position of the redundancy block 36 (see FIG. 3) in the frame structure.

The network component 13c forwards the data frame in the clockwise direction according to the identified priority level. Since it is a low-priority data frame, any other data frames already present in a send queue are all transmitted first before the data frame is forwarded.

The next network component 13d thereupon receives the forwarded data frame and performs the same steps as were already explained for the network component 13c.

Finally, the first data frame reaches the external network component 12.

The second data frame, which has been transmitted counterclockwise by the sender automation device, first reaches the network component 13a, which performs steps corresponding to those already described with regard to the first data frame and the network component 13c.

Finally, the second data frame also reaches the external network component 12.

The external network component 12 identifies duplicates following the principle already described above regarding the redundant transmission of data frames, forwards to the automation device 11f the data frame that it receives first, and discards as a duplicate the data frame arriving later. Alternatively, the external network component 12 can also forward both data frames to the automation device 11f, which thereupon performs duplicate identification itself.

It shall now be assumed that the sender automation device 11b transmits redundant data frames having a high priority level to the receiver automation device 11f in accordance with the procedure described above. The assignment of the priority level to the respective data frames is again performed by the sender automation device 11b. The data frames are transmitted using the first communication protocol, for example the HSR protocol, in accordance with the chosen high priority level.

Once again, the path of the first of the two redundant data frames (clockwise transmission direction) shall be considered first. After transmission by the sender automation device 11b, the data frame is received by the network component 13c of the automation device 11c. Since the network component 13c identifies from the receiver entered in the data frame that the data frame is not addressed to the automation device 11c, it checks the data frame for its communication protocol and deduces the associated priority level therefrom. Thus the network component 13c identifies from the use of the first communication protocol (e.g. HSR) that it is a data frame having a high priority level. Specifically, the identification can be made, for example, from the position of the redundancy block 25 (see FIG. 2) in the frame structure.

The network component 13c forwards the data frame in the clockwise direction according to the identified priority level. Since it is a high-priority data frame, it is forwarded preferentially by the network component 13c.

Provided that there are no other data frames waiting to be transmitted in the send queue, the data frame is forwarded immediately without further actions. This can take place, if applicable, even before the data frame has been received in full by the network component 13c, with the data frame being effectively "looped-through" in this case.

If, in another case, the send queue should already contain one or more high-priority data frames received earlier, the transmission of the current data frame follows directly on completion of the transmission of the last high-priority data frame in the send queue. Thus in this case a short delay may occur in the transmission.

In another case, should the send queue already contain one or more low-priority data frames received earlier, then in accordance with a first embodiment, the current transmission of a low-priority data frame is terminated, and the high-priority data frame is forwarded immediately instead. The received portion of a terminated low-priority data frame is discarded by a downstream network component 13d. The terminated low-priority data frame is subsequently re-transmitted by the network component 13c, provided there are no further high-priority data frames waiting for transmission.

According to another embodiment, the current transmission of the low-priority data frame is interrupted, and first the high-priority data frame is forwarded immediately. The portion of the low-priority data frame that has not been transmitted yet owing to the interruption is transmitted on completion of the transmission of the high-priority data frame, provided there are no further high-priority data frames waiting for transmission. The received portion of an interrupted low-priority data frame is stored by a downstream network component 13d until the remaining portion of the data frame has also been received by the downstream network component 13d. Only then is the low-priority data frame, which the network component 13d has now received in full, forwarded. This avoids the presence of too large a number of frame fragments in the communication network 10.

In all the cases described, the subsequent network component 13d performs the same steps with regard to received high-priority data frames as were already described for the network component 13c, and forwards these data frames immediately. All the further network components behave accordingly.

Finally, the first data frame reaches the external network component 12.

The second data frame, which has been transmitted counterclockwise by the sender automation device, first reaches the network component 13a, which performs steps corresponding to those already described with regard to the first data frame and the network component 13C.

Finally, the second data frame also reaches the external network component 12.

The external network component 12 identifies duplicates following the principle already described above regarding the redundant transmission of data frames, forwards to the automation device 11f the data frame that it receives first, and discards as a duplicate the data frame arriving later. Alternatively, the external network component 12 can also forward both data frames to the automation device 11f, which thereupon performs duplicate identification itself.

In order to be able to perform duplicate identification both for data frames of the first communication protocol and for data frames of the second communication protocol, the receiver automation device and/or the network component of the receiver automation device must be capable of processing flexibly the data frames of both communication protocols. In particular, a duplicates filter in the receiver automation device must know the particular position of the redundancy blocks for both communication protocols, and must be able to evaluate the redundancy blocks for the purpose of duplicate identification. The network components arranged between sender and receiver must also be able to process data frames of both types in order to be able to identify the priority level and identify circulating frames from the redundancy block.

The invention claimed is:

1. A method for transmitting data frames between automation devices of an automation system, the automation system containing a communication network having a ring topology, the automation devices transmitting the data frames redundantly via the communication network, which comprises the steps of:

sending, via a sender automation device, the data frames including a first data frame in a first transmission direction of the communication network, and a second data frame in a second transmission direction of the communication network, the second transmission direction being opposite to the first transmission direction;

assigning, via the sender automation device, a priority level to the data frames, wherein the data frames having a high priority level are transmitted via the communication network with a preference over the data frames having a low priority level, the sender automation device using a first communication protocol to transmit the data frames having the high priority level, and using a second communication protocol, which differs from the first communication protocol, to transmit the data frames having the low priority level; and processing via a receiver automation device the first or second data frame that is received first and discards the first or second data frame received next as a duplicate, a network component disposed in the communication network between the sender automation device and the receiver automation device receives a respective data frame, identifies the priority level of the respective data frame from a communication protocol used, and forwards the respective data frame taking into consideration an identified priority level to the receiver automation device.

2. The method according to claim 1, wherein the data frames that are transmitted using the first communication protocol differ in terms of frame structure from the data frames that are transmitted using the second communication protocol.

3. The method according to claim 2, wherein the data frames of the first communication protocol and of the second communication protocol differ at least in terms of a position in the frame structure of an identifier for the communication protocol type.

4. The method according to claim 3, which further comprises disposing the identifier for the data frames of the first communication protocol in an earlier position in the frame structure than the identifier for the data frames of the second communication protocol.

5. The method according to claim 4, which further comprises using a redundancy block as the identifier for a type of the communication protocol.

6. The method according to claim 5, wherein the receiver automation device contains a duplicates filter, which identifies the redundancy block of the data frames for each of the first and second communication protocols, reads a content of the redundancy block and uses a currently read redundancy block to identify and discard duplicates of the data frames that have already been received.

7. The method according to claim 5, wherein:
the network component disposed in the communication network between the sender automation device and the receiver automation device uses the redundancy block to identify the communication protocol of a received data frame;
the network component reads the redundancy block immediately after the redundancy block is received, and evaluates the redundancy block in terms of identifying the data frames circulating in the communication network; and
the network component immediately after completing an evaluation, forwards a data frame received for a first time and discards a data frame received more than once.

8. The method according to claim 1, which further comprises transmitting the data frames having the high priority level using a high availability seamless redundancy communication protocol, and the data frames having the low priority level are transmitted using a parallel redundancy communication protocol.

9. The method according to claim 1, wherein:
the network component disposed in the communication network between the sender automation device and the receiver automation device terminates an active forwarding of a data frame having the low priority level as soon as it receives a data frame having the high priority level;
the network component forwards first the data frame having the high priority level; and
the network component having completed transmission of the data frame having the high priority level, forwards again the data frame having the low priority level.

10. The method according to claim 1, wherein:
the network component disposed in the communication network between the sender automation device and the receiver automation device interrupts an active forwarding of a data frame having the low priority level as soon as it receives a data frame having the high priority level;
the network component forwards first the data frame having the high priority level; and
the network component having completed transmission of the data frame having the high priority level, forwards a portion that has not yet been forwarded of the data frame having the low priority level.

11. The method according to claim 10, which further comprises disposing a further network component in the communication network between the sender automation device and the receiver automation device, the further network component waits to receive in full the data frame having the low priority level before the further network component forwards the data frame having the low priority level.

12. An automation system, comprising:
a communication network having a ring topology;
a plurality of automation devices configured for redundant transfer of data frames via said communication network, said automation devices including at least a sender automation device, a receiver automation device and a switch disposed in said communication network between said sender automation device and said receiver automation device;
said sender automation device configured to send a first data frame in a first transmission direction of said communication network, and a second data frame in a second transmission direction of said communication network, which is opposite to said first transmission direction, said sender automation device configured to assign a priority level to the data frames, wherein the data frames having a high priority level are transmitted via said communication network with preference over the data frames having a low priority level, said sender automation device is further configured to use a first communication protocol to transmit the data frames having the high priority level, and to use a second communication protocol, which differs from the first communication protocol, to transmit the data frames having the low priority level;
said switch disposed in said communication network between said sender automation device and said receiver automation device is configured to receive a respective data frame, to identify the priority level of the respective data frame from a communication protocol used, and to forward the respective data frame taking into consideration an identified priority level; and
said receiver automation device is configured to process the first or second data frame that said receiver automation device receives first and to discard the first or second data frame received next as a duplicate.

13. A sender automation system for operation in an automation system, the sender automation system comprising:
a sender automation device configured for a redundant transmission of data frames, to send a first data frame in a first transmission direction of a communication network of the automation system, and a second data frame in a second transmission direction of the communication network, which is opposite to the first transmission direction;
said sender automation device is further configured to assign a priority level to the data frames, wherein the data frames having a high priority level are transmitted via the communication network with preference over the data frames having a low priority level; and
said sender automation device is additionally configured to use a first communication protocol to transmit the data frames having the high priority level, and to use a second communication protocol, which differs from the first communication protocol, to transmit the data frames having the low priority level.

14. A receiver automation system for operation in an automation system, the receiver automation system comprising:
a receiver automation device configured to process a data frame that said receiver automation device receives first and to discard another data frame of identical content as a duplicate; and
said receiver automation device contains a duplicates filter, which is configure to identify a corresponding redundancy block of the data frames of a first communication protocol and of a second communication protocol, which differs from the first communication protocol, to read a content of the corresponding redundancy block and to use a currently read redundancy block to identify and discard duplicates of the data frames that have already been received.

* * * * *